(12) United States Patent
Manthe et al.

(10) Patent No.: US 11,031,862 B2
(45) Date of Patent: Jun. 8, 2021

(54) SYSTEMS AND METHODS TO BALANCE MAGNETIC FLUX IN A SWITCHED MODE POWER SUPPLY

(71) Applicant: Illinois Tool Works Inc., Glenview, IL (US)

(72) Inventors: Alan Adam Manthe, Hortonville, WI (US); Maxwell Bode Brock, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 507 days.

(21) Appl. No.: 15/871,506

(22) Filed: Jan. 15, 2018

(65) Prior Publication Data
US 2019/0222116 A1 Jul. 18, 2019

(51) Int. Cl.
*H02M 1/40* (2007.01)
*H02M 7/48* (2007.01)
*B23K 9/10* (2006.01)
*H02M 7/5387* (2007.01)

(52) U.S. Cl.
CPC ............. *H02M 1/40* (2013.01); *B23K 9/1006* (2013.01); *H02M 7/48* (2013.01); *H02M 7/53871* (2013.01)

(58) Field of Classification Search
CPC ...... H02M 1/40; H02M 7/48; H02M 7/53871; B23K 9/1006
USPC ...................................................... 219/130.1
See application file for complete search history.

(56) References Cited

U.S. PATENT DOCUMENTS

| 4,439,822 | A | 3/1984 | Cocconi |
| 5,446,641 | A | 8/1995 | Reynolds |
| 5,824,990 | A | 10/1998 | Geissler |
| 5,926,381 | A * | 7/1999 | Moriguchi .......... H02M 7/5387 363/132 |
| 6,815,639 | B2 | 11/2004 | Geissler |

(Continued)

FOREIGN PATENT DOCUMENTS

WO 2016073145 5/2016

OTHER PUBLICATIONS

Ortiz, G., et al. Flux Balancing of Isolation Transformers and Application of "The Magnetic Ear" for Closed-Loop Volt-Second Compensation, IEEE Transactions on Power Electronics, vol. 29, No. 8, pp. 4078-4090, Aug. 2014 (14 pages).

(Continued)

*Primary Examiner* — Huyen D Le
(74) *Attorney, Agent, or Firm* — McAndrews, Held & Malloy, Ltd.

(57) ABSTRACT

Systems and methods to reduce magnetic flux in a switched mode power supply are disclosed. An example welding-type power supply includes a switched mode power supply, comprising: a transformer configured to transform an input voltage to a welding-type voltage; a capacitor in series with a primary winding of the transformer; switches configured to control a voltage applied to a series combination of the primary winding of the transformer and the capacitor; a comparator coupled to the transformer and configured to compare the welding-type output voltage to a threshold voltage; and a flux accumulator to determine a net flux in the transformer based on the voltage applied to the series combination of the primary winding of the transformer and the capacitor.

14 Claims, 5 Drawing Sheets

(56) References Cited

U.S. PATENT DOCUMENTS

| | | | |
|---|---|---|---|
| 7,420,351 B2* | 9/2008 | Grbovic | H02M 1/4225 |
| | | | 318/772 |
| 9,647,555 B2* | 5/2017 | Kooken | B23K 9/1056 |
| 9,855,620 B2* | 1/2018 | Kooken | B23K 9/1075 |
| 9,862,052 B2* | 1/2018 | Vogel | B23K 9/1043 |
| 10,500,669 B2* | 12/2019 | Schartner | B23K 9/1062 |
| 2007/0070655 A1 | 3/2007 | Eguchi | |
| 2013/0088895 A1 | 4/2013 | Ye | |
| 2014/0021180 A1 | 1/2014 | Vogel | |
| 2015/0053660 A1 | 2/2015 | Schartner | |
| 2015/0365005 A1 | 12/2015 | Panov | |

OTHER PUBLICATIONS

Int'l Search Report and Written Opinion for PCT/US2018/023507 dated Jul. 3, 2018 (15 pgs).
Int'l Search Report and Written Opinion for PCT/US2018/055804 dated Jan. 21, 2019 (11 pgs).
Int'l Search Report and Written Opinion for PCT/US2019/013573 dated May 10, 2019 (21 pgs).

* cited by examiner

SYSTEMS AND METHODS TO BALANCE MAGNETIC FLUX IN A SWITCHED MODE POWER SUPPLY

BACKGROUND

The disclosure relates generally to welding systems and, more particularly, to systems and methods to balance magnetic flux in a switched mode power supply.

A type of conventional welding-type power supply that is well suited for portability and for receiving different input voltages is a multi-stage system with a pre-regulator to condition the input power and provide a stable bus, and an output circuit that converts or transforms the stable bus to a welding-type output. Such conventional welding-type power supplies using transformers that are subject to magnetic saturation, which may be referred to as a volt-second rating. If the transformer is saturated, the system can become unusable.

SUMMARY

Systems and methods to balance magnetic flux in a switched mode power supply are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Conventional welding-type power supplies use one or more of the following methods to avoid saturation of the high-frequency transformer: 1) an instantaneous flux limit that restricts the duty cycle in either polarity to an upper limit; 2) flux balancing, which limits how quickly the flux applied is able to change to keep the positive and negative cycles closer to balancing on an instantaneous basis to avoid exceeding the volt-second rating in one direction; and flux centering, in which the magnetic flux applied to the transformer is continually summed during each switching period. Flux centering acts to modify the positive and negative duty cycles over time to maintain the accumulated flux near zero.

One shortcoming of conventional flux centering is that the method assumes that one-half of the bus voltage is applied in both the positive and negative direction. Under some transient conditions, for example when a large load is applied or removed, the voltage across the series capacitor may no longer equal one-half of the bus voltage, and asymmetrical voltage can be applied without knowledge of the flux centering logic. For example, if the bus is at 600V, and the series cap is at 310V, the voltage applied to the transformer during the positive half cycle is 290V, and during the negative cycle it is 310V. This unbalanced voltage results in a volt-second mismatch applied to the transformer. A conventional flux accumulator assumes that 300V is applied in both directions, so the flux accumulator does not identify the voltage imbalance. If the capacitor remains imbalanced for several PWM cycles, a net volt-second imbalance can accumulate and the transformer can be driven into saturation, resulting in an error condition and/or unexpected shutdown of the welding power supply. The present disclosure describes systems and methods for detecting transient conditions that may cause asymmetrical voltage across the series capacitor. The present disclosure also describes systems and methods for responding to such transient conditions by balancing the voltage across the series capacitor.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, the term "welding-type voltage" refers to a voltage suitable for welding, plasma cutting, induction heating, CAC-A, and/or hot wire welding/preheating (including laser welding and laser cladding).

As used herein, the term "positive current" through a transformer refers to a current flowing in a first direction, and the term "negative current" through the transformer refers to a current in a second direction opposite the first direction.

Some examples involve a welding-type power supply comprising a switched mode power supply, comprising: a transformer configured to transform a bus voltage to a welding-type voltage; a capacitor in series with a primary winding of the transformer, the capacitor having a capacitor voltage; and switches configured to control a voltage applied to a series combination of the primary winding of the transformer and the capacitor; and a controller configured to: detect a transient condition in which the bus voltage exceeds a threshold voltage; and control duty cycles of the switches in response to the transient condition to adjust the capacitor voltage based on the bus voltage.

In some examples, the welding-type power supply further includes a flux accumulator configured to determine a net flux in the transformer based on a number of volt-seconds applied to the primary winding of the transformer, and wherein the controller is further configured to control the duty cycles of the switches to balance the net flux when the capacitor voltage is within a threshold voltage range based on the bus voltage.

In some examples, the controller is configured to detect the transient condition based on comparing one of the welding-type voltage, the bus voltage, or the capacitor voltage to a transient threshold voltage. In some examples, the controller is configured to adjust the duty cycles of the switches to unbalance a net flux in the transformer for a threshold time period to adjust the capacitor voltage in response to the transient condition. In some examples, the threshold time period is approximately two milliseconds. In some examples, the controller is further configured to adjust the duty cycles of the switches to balance the net flux in response to at least one of elapsing of the threshold time period or determining that the capacitor voltage is within a threshold voltage range based on the bus voltage.

In some examples, the controller is configured to adjust the capacitor voltage by at least one of: increasing a first duty cycle corresponding to a first period during which a voltage applied to the primary winding is equal to the difference between the bus voltage and the capacitor voltage, or decreasing a second duty cycle corresponding to a second period during which the voltage applied to the primary winding is equal to the capacitor voltage.

In some examples, the controller is configured to adjust the duty cycles of the switches until the capacitor voltage is within a threshold range of one-half of the bus voltage. In some examples, the controller is configured to detect the transient condition by detecting at least one of: a first threshold change in the bus voltage in less than a threshold time period; a second threshold change in the welding-type voltage in less than the threshold time period; or a third threshold change in the capacitor voltage in less than the threshold time period.

In some examples, the threshold time period is less than two switching cycles, each switching cycle comprising a positive current through the primary of the transformer and a negative current through the primary of the transformer. In some examples, the switched mode power supply comprises a stacked full bridge topology.

Some examples involve a welding-type power supply, comprising: a transformer configured to transform a bus voltage to a welding-type voltage; a capacitor in series with a primary winding of the transformer, the capacitor having a capacitor voltage; and switches configured to control a voltage applied to a series combination of the primary winding of the transformer and the capacitor; and a controller configured to: control duty cycles of the switches; detect a transient condition in which the bus voltage exceeds a threshold voltage; and in response to detecting the transient condition, control a capacitor voltage balancing circuit to adjust the capacitor voltage based on the bus voltage.

In some examples, the capacitor voltage balancing circuit is configured to regulate the capacitor voltage within a predetermined range that is based on the bus voltage. In some examples, the capacitor voltage balancing circuit comprises a first switching element and a second switching element coupled in series and configured to selectively couple the capacitor to a reference voltage, the controller configured to control the first switching element and the second switching element to couple the capacitor to the reference voltage in response to detecting the transient condition. In some examples, the capacitor voltage balancing circuit comprises a combination of a diode and a transistor in series, and configured to selectively couple the capacitor to a reference voltage, the controller configured to control the transistor to couple the capacitor to the reference voltage in response to detecting the transient condition.

Some examples involve a method to control a welding-type power supply, comprising: controlling, via control circuitry, switches of a stacked full bridge switched mode power supply to provide current to a primary winding of a transformer to generate a welding-type current output via a secondary winding of the transformer, the primary winding being in series with a capacitor having a capacitor voltage; detecting, via the control circuitry, a transient condition on a bus voltage input to the stacked full bridge switched mode power supply; and in response to detecting the transient condition, controlling duty cycles of the switches via the control circuitry to adjust the capacitor voltage based on the bus voltage.

In some examples, the method further involves determining, via a flux accumulator, a net flux in the transformer based on a number of volt-seconds applied to the primary winding of the transformer, and controlling, via the control circuitry, the duty cycles of the switches to balance the net flux when the capacitor voltage is within a threshold voltage range based on the bus voltage.

In some examples, the circuitry detects the transient condition based on comparing one of the welding-type voltage, the bus voltage, or the capacitor voltage to a transient threshold voltage.

In some examples, the method further comprises adjusting, via control circuitry, the duty cycles of the switches to unbalance a net flux in the transformer for a threshold time period to adjust the capacitor voltage in response to the transient condition. In some examples, the method further comprises adjusting, via control circuitry, the duty cycles of the switches to balance the net flux in response to at least one of elapsing of the threshold time period or determining that the capacitor voltage is within a threshold voltage range based on the bus voltage.

In some examples, the capacitor voltage is adjusted in response to detecting the transient condition by at least one of: increasing a first duty cycle corresponding to a first period during which a voltage applied to the primary winding is equal to the difference between the bus voltage and the capacitor voltage, or decreasing a second duty cycle corresponding to a second period during which the voltage applied to the primary winding is equal to the capacitor voltage. In some examples, the control circuitry detects the transient condition by detecting at least one of: a first threshold change in the bus voltage in less than a threshold time period; a second threshold change in the welding-type voltage in less than the threshold time period; or a third threshold change in the capacitor voltage in less than the threshold time period.

Figure 1:
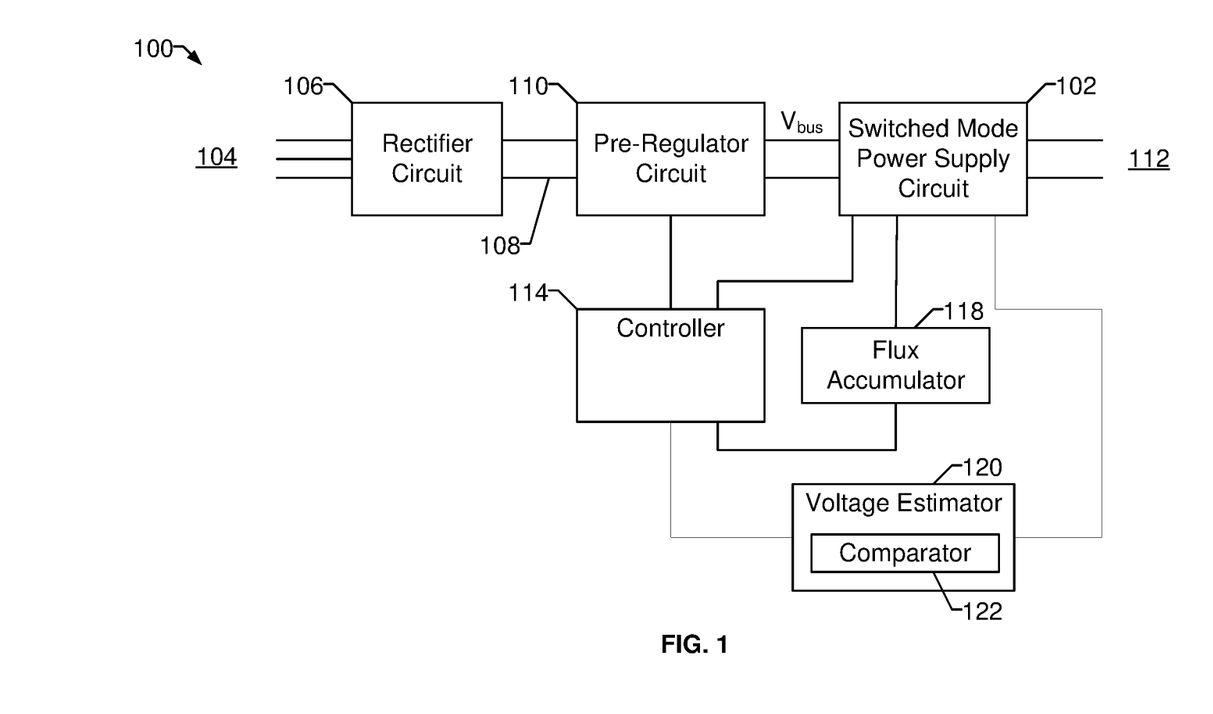
FIG. 1 is a block diagram of an example welding-type power supply, including a switched mode power supply topology, configured to balance and/or center magnetic flux in a transformer of the switched mode power supply, in accordance with aspects of this disclosure.

FIG. 1 is a block diagram of an example welding-type power supply 100, including a switched mode power supply 102, configured to estimate magnetic flux in a transformer of the switched mode power supply 102. The example welding-type power supply 100 of FIG. 1 receives an AC line voltage 104 (e.g., AC single-phase or three-phase power) at a rectifier 106.

The rectifier 106 rectifies the AC line voltage 104. Example values for the AC line voltage 104 can range from 115 VAC or lower to 600 VAC or higher. The power supply 100 may be designed for a single nominal AC line voltage and/or for a range of AC line voltages. The rectifier 106 may include a filter capacitor, and provides a rectified line voltage 108.

A pre-regulator 110 provides a regulated bus voltage (e.g., $V_{bus}$), which may be regulated to a voltage greater than the peak of the rectified line voltage 108. The pre-regulator circuit 110 may also contain a power factor correction circuit and/or control to improve the power factor for the current or power drawn from the line voltage 104. The pre-regulator circuit 110 may include a boost converter circuit arrangement. In some examples, the pre-regulator 110 may be omitted and the rectified line voltage 108 provided to the switched mode power supply circuit 102 as the bus voltage $V_{bus}$ (e.g., with or without filtering and/or other conditioning of the rectified line voltage 108).

The switched mode power supply 102 receives the bus voltage $V_{bus}$ and outputs welding-type power 112. As described in more detail below, the switched mode power supply 102 includes a high frequency transformer that has a saturation point for magnetic flux.

The example power supply 100 includes a controller 114 that controls the pre-regulator circuit 110 and the switched mode power supply 102. For example, the controller 114 may control switching of a power semiconductor in the pre-regulator circuit 110 to control the regulated bus voltage $V_{bus}$. The controller 114 may control the switching of the power semiconductor in the pre-regulator circuit 110 so as to provide a regulated bus voltage $V_{bus}$ as well as to perform power factor correction.

The controller 114 is a circuit, including digital and/or analog circuitry, discrete and/or integrated circuitry, microprocessors, DSPs, etc., software, hardware and/or firmware, located on one or more circuit boards, that form part or all of a controller, and are used to control a welding process, or a device such as a power source.

Figure 2:
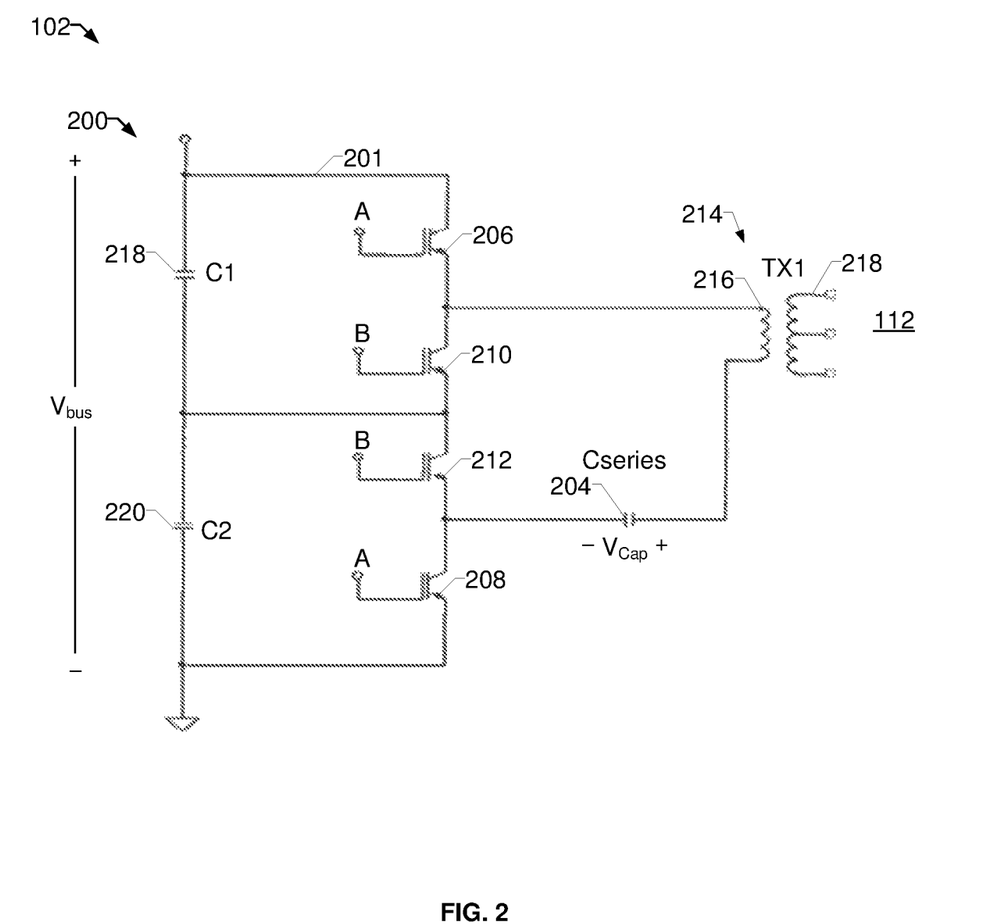
FIG. 2 is a schematic diagram of an example implementation of the switched mode power supply of FIG. 1, including a full stacked bridge topology.

FIG. 2 is a schematic diagram of an example stacked full bridge circuit 200 that may be used to implement the switched mode power supply 102 of FIG. 1. The stacked full bridge circuit 200 of FIG. 2 receives the regulated bus voltage $V_{bus}$ 201, controls a voltage provided to a primary side of a high-frequency transformer 214, and outputs the welding-type power 112 from a secondary side of the transformer 214.

The switched mode power supply 200 of FIG. 2 includes a capacitor 204 in series with the high-frequency transformer 214. The series capacitor 204 has a capacitor voltage $V_{cap}$ approximately half of the bus voltage $V_{bus}$ 201. The capacitor 204 allows for bidirectional current flow in the transformer 214. The switched mode power supply 200 further includes switching elements 206, 208, 210, 212. The control terminals of the switching elements 206-212 (e.g., the gates when using transistors for the switching elements) are labeled "A" and "B" in FIG. 2 to indicate the switching elements 206-212 that are controlled in combination. In some examples, the example switching elements 206-212 may be insulated-gate bipolar transistors (IGBTs).

The transformer 214 is driven with a positive voltage for a positive half-cycle by turning on the "A" switching elements 206, 208, which applies a voltage equal to $V_{bus}$–$V_{cap}$ to the primary winding 216 of the transformer 214. A negative half-cycle is accomplished by turning on the "B" switching elements 210, 212, which applies a voltage equal to $-V_{cap}$ 202 to the primary winding 216 of the transformer 214. The nominal value of $V_{cap}$ is $V_{bus}/2$, so the positive and negative half-cycles both nominally apply voltages of $V_{bus}/2$, with opposite polarities for the different half-cycles. In each of the positive half-cycle and the negative half-cycle, the magnetic flux in the core of the transformer 214 changes in accordance with the applied voltage and current. When the positive half-cycle and the negative half-cycle are on for the same lengths of time, the net magnetic flux (volt-seconds) applied to the transformer 214 is zero over the course of one period (i.e., one positive half-cycle and one negative half-cycle) when $V_{cap}$ 202 is $V_{bus}/2$. The transformer 214 has a volt-second rating that the transformer 214 can withstand before it saturates. While the flux is balanced, the switched mode power supply 200 avoids saturating the transformer 214.

The example switched mode power supply 200 pre-biases the capacitor 204 to have a capacitor voltage $V_{cap}$ 202 of half the bus voltage $V_{bus}$ 201 (e.g., using balancing resistors before the switched mode power supply 200 is enabled to provide an output). The capacitance value of the example capacitor 204 is such that the capacitor voltage $V_{cap}$ 202 may only change by a few volts above and below one half the bus voltage $V_{bus}$ 201 at twice the switching frequency of the switching elements 206-212 (e.g., a PWM frequency) under normal circumstances. However, under dynamic load conditions, or current commands, the capacitor 204 may deviate farther from its nominal voltage.

Returning to FIG. 1, to reduce the likelihood of saturating the transformer 214 in the switched mode power supply 102, the example welding-type power supply 100 includes a flux accumulator 118. The example welding type power supply 100 also includes a voltage estimator 120 is coupled to the switched mode power supply 102 and/or the controller 114. In some example power supplies, the voltage estimator determines the AC-coupled voltage at the capacitor 204 by measuring the current flowing through a current transformer in series with the capacitor 204. In some examples, the voltage estimator 120 measures the voltage of the capacitor 204, measures the voltage at the bus, measures the voltage at the primary winding 216 of the transformer 214, measures a voltage at a secondary winding 218 of the transformer 214, and/or measures a voltage at a tertiary winding of the transformer 214. In some examples, the controller 114 may compare measured voltages at the capacitor 204, the bus 201, the primary winding 216, the secondary winding 218, and/or a tertiary winding of the transformer 214, to a respective threshold voltage to determine if a transient condition exists.

In some example power supplies, a current detector includes at least one of a current transformer, a Hall effect sensor, a sense resistor, or a magnetoresistive current sensor, to measure current flowing in the bus 201, the capacitor 204, the primary winding 216, the secondary winding 218, and/or a tertiary winding, to identify a transient condition. In some examples, the controller 114 controls duty cycles of the switches 206-212 to reduce the value of the net flux from a saturation value while continuing to generate an output from the welding-type power supply 100.

The controller 114 may employ one or more techniques to avoid transformer saturation in the switched mode power supply 102. The flux accumulator 118 determines a net flux in the transformer 214 applied to the primary winding of the transformer 214 and/or to a series combination of the capacitor 204 and the transformer 214 when such a capacitor 204 is present. As used herein, the term "net flux" refers to an accumulation (e.g., integration, summation, etc.) of volt-seconds in a core of the transformer 214 over one or more processing cycles of the flux accumulator 118 (e.g., a half switching cycle, a whole switching cycle, multiple switching cycles, etc.). For example, the flux accumulator 118 may integrate the flux in the transformer 214 to maintain history of the net flux (e.g., volt*sec) that has been applied to the transformer 214. In some examples, the flux accumulator 118 tracks the PWM values output by the controller 114 to the switching elements 206-212. The flux accumulator 118 calculates the net flux by adding the positive PWM value and subtracting the negative PWM value, to a running accumulator.

A first technique is an instantaneous flux limit that restricts the duty cycle in either polarity to an upper limit, thereby limiting an amount of flux that can be added or removed from the transformer 214 in any given cycle. A second technique involves flux balancing, which limits how quickly applied flux can change, to keep the positive and negative current cycles closer to balancing on an instantaneous basis, to thereby avoid exceeding the volt-second rating of the transformer 214 in a single direction. For example, if the switched mode power supply 102 is running operating at a 5% duty cycle, and is commanded to change to 40% duty cycle to satisfy a changing load condition, the controller 114 executing the control loop will not change the duty cycle to 40% on the next PWM. Instead, the controller 114 increases it in uniform or non-uniform increments (e.g., 15%, 25%, 35%, 40%) until the desired command duty cycle is reached over several PWM cycles.

A third technique is a flux centering algorithm. The controller 114 continually sums up the flux applied to the transformer 214 during each switching period. Dynamically, the controller 114 permits the flux to accumulate up to the volt-second limit of the transformer. However, controller 114 performs flux centering to slowly modify the duty cycles of either the "A" or "B" pairs of switching elements 206-212 to bring the accumulated flux closer to zero. The flux centering reduces or avoids incremental increase of the flux in the transformer 214 to either positive or negative saturation by maintaining the flux to be generally centered at or near zero.

A fourth technique may be used to balance the flux in response to transient conditions that may be caused by changing load conditions. Transient conditions may be created in the switched mode power supply 120 by large load changes. Referring to FIG. 2, during transient conditions, $V_{bus}$ 201 can experience an overshoot in voltage due to energy stored in the input circuits. Overshoot on $V_{bus}$ 201 causes a volt-second imbalance in the transformer 214, because the capacitor voltage $V_{cap}$ cannot change instantaneously. Similarly, other load changing conditions may cause an undervoltage at $V_{bus}$ 201, which can also cause a volt-second imbalance for the same reason. If the capacitor voltage $V_{cap}$ is not balanced to $V_{bus}/2$, then the voltage applied during the duty cycles of the "A" and "B" pairs of switching elements 206-212 will not be equal, which causes the transformer flux to increase or decrease. Sufficiently large and/or lengthy increases or decreases in transformer flux can eventually saturate the transformer 214, as more volt-seconds are applied during either the "A" or the "B" duty cycle.

To balance the flux after a transient condition, a transient condition is first be detected. In some examples, the controller 114 detects a transient condition by comparing the output voltage 112 to an adjustable threshold voltage to determine if a load change has caused a transient condition. In other examples, the controller 114 may measure the capacitor voltage $V_{cap}$ and compare the capacitor voltage $V_{cap}$ to an adjustable threshold voltage to determine if a transient condition exists. In other examples, the controller 114 may measure the bus voltage $V_{bus}$ and compare the bus voltage $V_{bus}$ to an adjustable threshold voltage to determine if a transient condition exists.

In some examples, the controller 114 detects a transient condition by detecting a threshold change in the output voltage 112, the bus voltage $V_{bus}$, and/or the capacitor voltage $V_{cap}$ in less than a threshold time period. For example, the controller may detect a transient condition by detecting a threshold change in one of the output voltage 112, $V_{bus}$ 201, or $V_{cap}$ 202 in less than two switching cycles.

In other examples, a dedicated comparator 122 may be included in the voltage estimator 120. The comparator 122 may be coupled to the controller 114 and/or the switched mode power supply 102. The comparator 122 may measure the capacitor voltage $V_{cap}$ and compare the capacitor voltage $V_{cap}$ to an adjustable threshold voltage to determine if a transient condition exists. In other examples, the comparator 122 may measure the bus voltage $V_{bus}$ and compare the bus voltage $V_{bus}$ to an adjustable threshold voltage to determine if a transient condition exists. In other examples, the comparator 122 is coupled to the controller 114 and the welding type power output 112. The comparator 122 compares the welding type output 112 to an adjustable threshold voltage to determine if a transient condition exists.

When a transient condition is detected, in some examples the controller 114 ignores or turns off the balancing techniques disclosed above, and instead uses the fourth technique to balance the flux. The fourth technique involves intentionally unbalancing the flux for a selected period of time, and/or until the capacitor voltage $V_{cap}$ measures $V_{bus}/2$. For example, in reaction to a step overshoot to the bus voltage $V_{bus}$, a small amount of pulse width is added to the "A" duty cycle, or similarly a small amount of pulse width is subtracted from the "B" cycle. Or in reaction to an undervoltage at bus voltage $V_{bus}$, a small amount of pulse width is added to the "B" duty cycle, or similarly a small amount of pulse width is subtracted from the "A" cycle. The controller may measure the voltage at the bus voltage $V_{bus}$ when a transient condition is detected to determine if the transient condition caused a step overshoot or an undervoltage at the bus voltage $V_{bus}$. The controller 114, by adjusting the duty cycles of the switches 206-212, thus unbalances the flux for either a predetermined period of time, or until the capacitor voltage $V_{cap}$ measures $V_{bus}/2$. Unbalancing the flux in such a manner balances the capacitor voltage $V_{cap}$ to $V_{bus}/2$. In some examples, a predetermined period of time may be two milliseconds. Adjusting the pulse widths in such a manner does create a small amount of flux walk in one direction. However, as the capacitor voltage $V_{cap}$ is at or near the $V_{bus}/2$ equilibrium point, the transformer 214 will not saturate. Once the capacitor voltage $V_{cap}$ is back at the equilibrium point, the time based flux balancing techniques disclosed above may be used to prevent saturation.

In some examples when a transient condition is detected, the controller 114 communicates to the flux accumulator 118 that more or less flux has accumulated than has actually accumulated. For example, in reaction to a step overshoot to the bus voltage $V_{bus}$, the controller 114 may add a small amount to the net flux accumulated calculation tracked by the flux accumulator 118. The flux accumulator 118 then calculates that more flux has accumulated during the "B" cycle than during the "A" cycle, even though more flux has actually accumulated during the "A" cycle than during the "B" cycle. In response, a flux centering algorithm as disclosed above adds a small amount of pulse width to the "A" cycle, or similarly subtracts a small amount of pulse width is subtracted from the "B" cycle. This process unbalances the flux, which balances the capacitor voltage $V_{cap}$ to the $V_{bus}/2$ equilibrium point. Adjusting the pulse widths in such a manner does create a small amount of flux walk in one direction. However, as the capacitor voltage $V_{cap}$ is at or near the $V_{bus}/2$ equilibrium point, the transformer 214 will not saturate. Once a predetermined period of time has passed, or once the capacitor voltage $V_{cap}$ is back at the equilibrium point, the controller 114 may subtract the same amount of net flux from the flux accumulator 118 that the controller 114 added previously. Since the capacitor voltage $V_{cap}$ is then at the $V_{bus}/2$ equilibrium point, the time-based flux balancing techniques described above may be used to prevent saturation.

Figure 3:
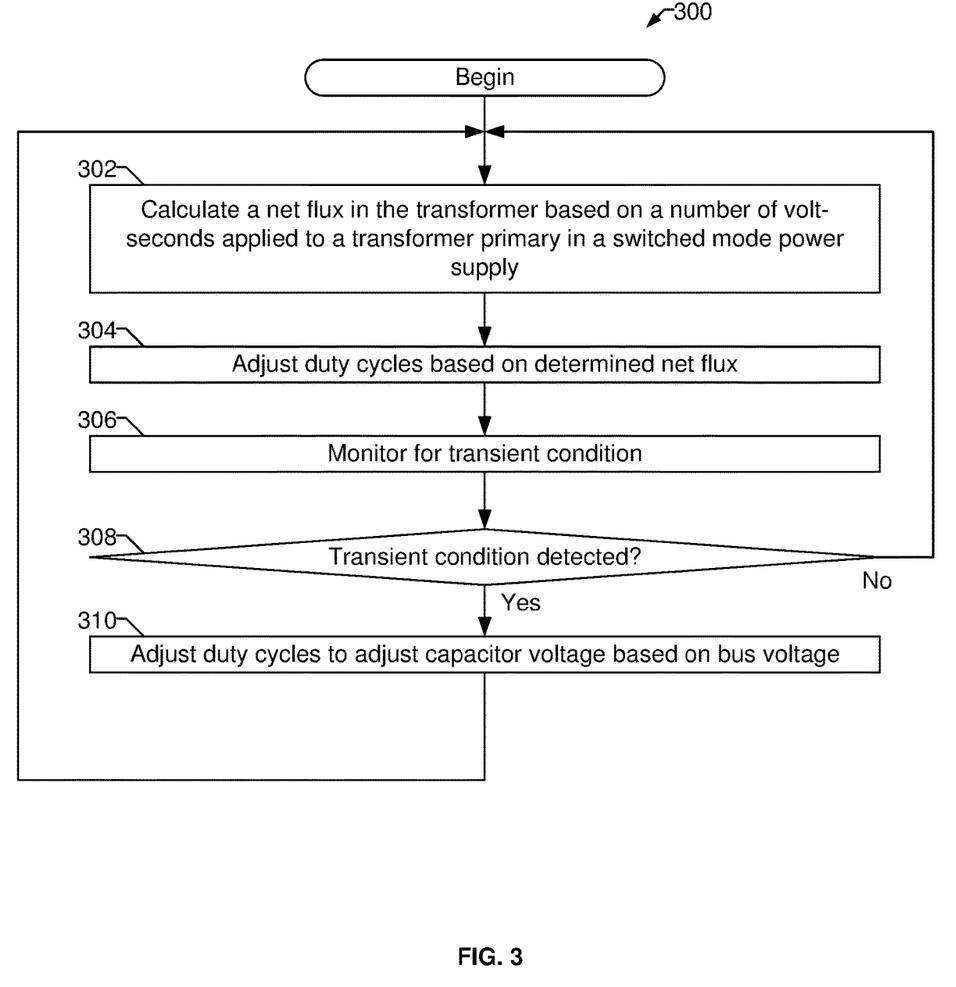
FIG. 3 is a flowchart representative of example method that may be performed by the example welding-type power supply of FIG. 1 to balance magnetic flux in response to a transient condition.

FIG. 3 is a flowchart representative of example method 300 that may be performed by the example welding-type power supply 100 of FIG. 1 to reduce magnetic flux in a transformer 214 of the switched mode power supply 102 in the welding-type power supply 100.

At block 302, the flux accumulator 118 of FIG. 1 determines a net flux in the transformer 202 based on a number of volt-seconds applied (e.g., by the switching elements 206-212) to the primary winding of the transformer 202.

At block 304, the controller adjusts the duty cycles of the switches 206-212 to balance the flux in accordance with the net flux in the transformer 214 determined in block 302. At block 306, the controller 114 monitors for a transient condition. The controller may monitor for a transient condition by comparing on of the output voltage 112, the bus voltage $V_{bus}$, or the capacitor voltage $V_{cap}$ to an adjustable threshold voltage. In some examples, the controller 114 may detect whether the output voltage 112, the bus voltage $V_{bus}$, or the capacitor voltage $V_{cap}$ exceed a threshold voltage. In other examples, the controller 114 may detect whether the output voltage 112, the bus voltage $V_{bus}$, or the capacitor voltage $V_{cap}$ is below a threshold voltage. In some examples, the controller may detect whether the output voltage 112, the bus voltage $V_{bus}$, or the capacitor voltage $V_{cap}$ exceed a first threshold voltage, or is below a second threshold voltage.

At block 308, if the controller 114 determines that a transient condition does not exist, then the method loops back to block 302 to determine the net flux in the transformer 214. At block 308, if a transient condition does exist, then the method moves on to block 310, where the controller adjusts the duty cycles of switches 206-212 to adjust the capacitor voltage based on the bus voltage.

In some examples, at block 310, the controller controls the switches 206-212 to intentionally imbalance the flux for a predetermined period. For example, the predetermined period may be two milliseconds. In some examples, the flux may be intentionally unbalanced until the capacitor voltage $V_{cap}$ equals $V_{bus}/2$. When the flux is intentionally unbalanced in this way, the capacitor voltage $V_{cap}$ adjusts to $V_{bus}/2$ and the transformer 214 does not saturate. After the predetermined period, the method loops back to block 302 to determine the net flux in the transformer 214. When the capacitor voltage $V_{cap}$ is at the equilibrium position of $V_{bus}/2$, time based flux balancing algorithms can effectively balance the flux in the transformer.

Figure 4:
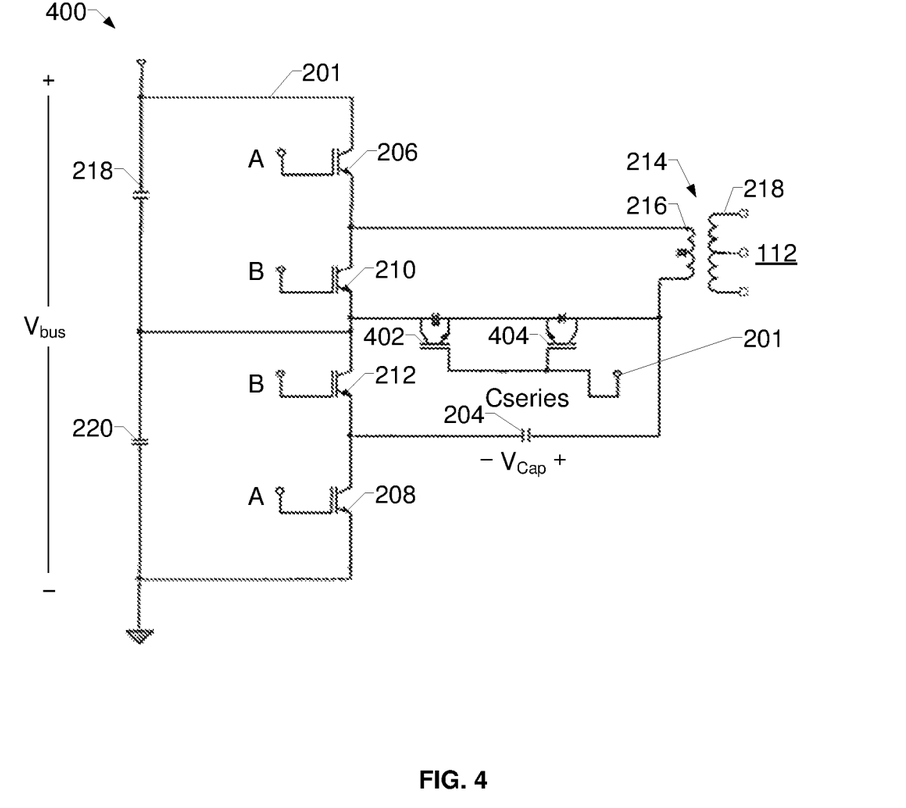
FIG. 4 is a schematic diagram of an example implementation of the switched mode power supply of FIG. 1, including a full stacked bridge topology comprising additional hardware to balance the voltage applied to the transformer.

FIG. 4 is a schematic diagram of an example implementation 400 of the switched mode power supply 102 of FIG. 1 wherein hardware has been added to the example implementation 200 shown in FIG. 2 which forces the capacitor voltage $V_{cap}$ to remain at, or within a predetermined range of, the equilibrium point $V_{bus}/2$. In the disclosed example of FIG. 4, a first switching element 402 and a second switching element 404 are added to the switch mode power supply 400. Other circuitry in the system actively balances a first capacitor 218 and a second capacitor 220 at equal or substantially equal voltages. When the balance gate 201 is turned on at the same time as the A switch 208, the series capacitor 204 is in parallel with the second capacitor 220, causing the voltages across the series capacitor 204 (the capacitor voltage $V_{cap}$) and the second capacitor 220 to be equal. Since the capacitors 218, 220 are equal, the capacitor voltage $V_{cap}$ will be at the equilibrium point $V_{bus}/2$.

Figure 5:
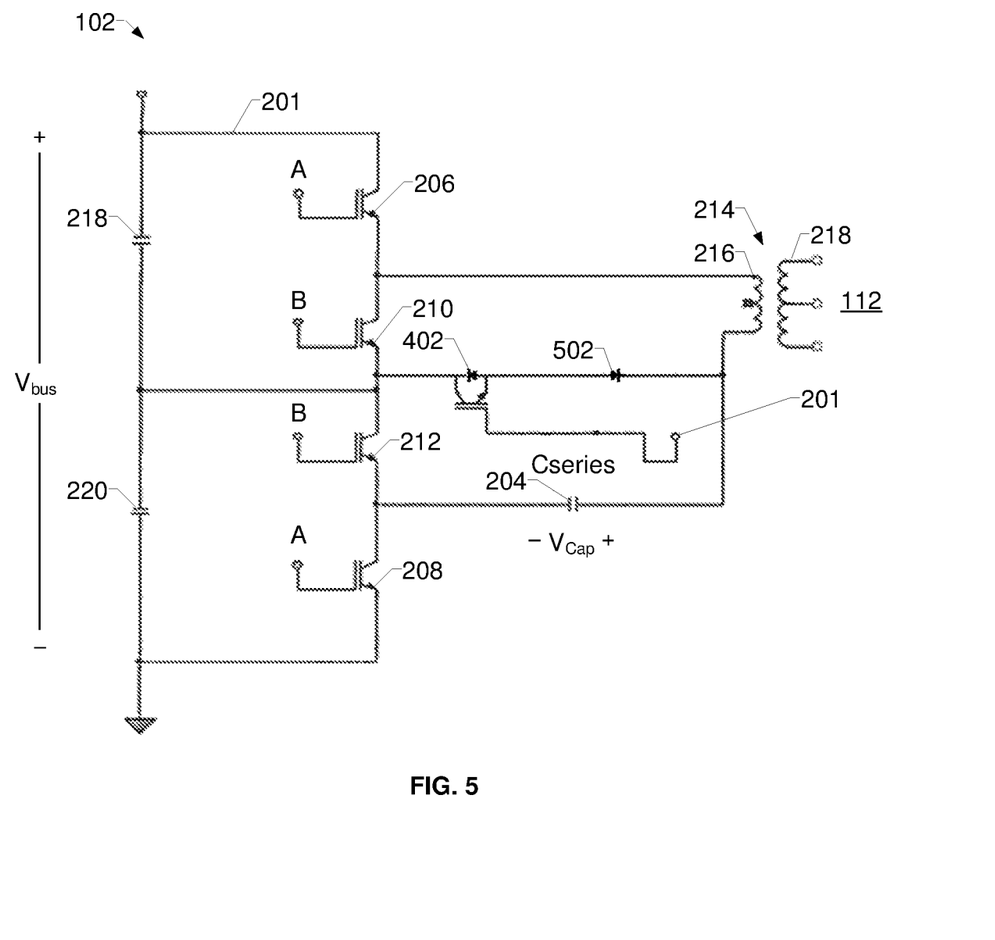
FIG. 5 is a schematic diagram of an example implementation of the switched mode power supply of FIG. 1, including a full stacked bridge topology comprising additional hardware to balance the voltage applied to the transformer.

FIG. 5 is a schematic diagram that illustrates another example 500 of an implementation of the switched mode power supply 102 of FIG. 1 wherein hardware has been added to the example implementation 200 shown in FIG. 2 which forces the capacitor voltage $V_{cap}$ to stay at, or within a predetermined range of, the equilibrium point $V_{bus}/2$. Other circuitry in the system actively balances the capacitors 218, 220 at equal voltages. In the example implementation shown in FIG. 5, a diode 502 has replaced the switching element 404 of FIG. 4. Similarly to the example described above, when the balance gate 201 is turned on at the same time as the A switch 208, the series capacitor 204 is in parallel with the second capacitor 220, causing the voltages across the series capacitor 204 (the capacitor voltage $V_{cap}$) and the second capacitor 220 to be equal.

Referring to FIG. 4, in some examples the additional hardware, transistors 402 and 404 may regulate $V_{cap}$ within a certain range, the range based on the bus voltage $V_{bus}$. The controller 114 may monitor the bus voltage $V_{bus}$ and the capacitor voltage $V_{cap}$, and then adjust the switching elements 402 and 404 to maintain the capacitor voltage $V_{cap}$ within a certain range of $V_{bus}/2$. Similarly referring to FIG. 5, the additional hardware, the transistors 402 and the diode 502, may regulate the capacitor voltage $V_{cap}$ within a certain range, the range being based on the bus voltage $V_{bus}$. The controller 114 may monitor the bus voltage $V_{bus}$ and the capacitor voltage $V_{cap}$, and then adjust the switching elements 402 to maintain the capacitor voltage $V_{cap}$ within a certain range of $V_{bus}/2$.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components, any analog and/or digital components, power and/or control elements, such as a microprocessor or digital signal processor (DSP), or the like, including discrete and/or integrated components, or portions and/or combination thereof (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power supply, comprising:
    a switched mode power supply, comprising:
        a transformer configured to transform a bus voltage to a welding-type voltage;
        a capacitor in series with a primary winding of the transformer, the capacitor having a capacitor voltage; and
        switches configured to control a voltage applied to a series combination of the primary winding of the transformer and the capacitor;
    a flux accumulator configured to determine a net flux in the transformer based on a number of volt-seconds applied to the primary winding of the transformer; and
    a controller configured to:
        detect a transient condition in which the bus voltage exceeds a threshold voltage;
        control the duty cycles of the switches to balance the net flux when the capacitor voltage is within a threshold voltage range based on the bus voltage; and
        control duty cycles of the switches in response to the transient condition to adjust the capacitor voltage based on the bus voltage.

2. The welding-type power supply as defined in claim 1, wherein the controller is configured to detect the transient condition based on comparing one of the welding-type voltage, the bus voltage, or the capacitor voltage to a transient threshold voltage.

3. The welding-type power supply as defined in claim 1, wherein the controller is configured to adjust the capacitor voltage by at least one of: increasing a first duty cycle corresponding to a first period during which a voltage applied to the primary winding is equal to the difference between the bus voltage and the capacitor voltage, or decreasing a second duty cycle corresponding to a second period during which the voltage applied to the primary winding is equal to the capacitor voltage.

4. The welding-type power supply as defined in claim 1, wherein the controller is configured to adjust the duty cycles of the switches until the capacitor voltage is within a threshold range of one-half of the bus voltage.

5. The welding-type power supply as defined in claim 1, wherein the controller is configured to detect the transient condition by detecting at least one of: a first threshold change in the bus voltage in less than a threshold time period; a second threshold change in the welding-type voltage in less than the threshold time period; or a third threshold change in the capacitor voltage in less than the threshold time period.

6. The welding-type power supply as defined in claim 5, wherein the threshold time period is less than two switching cycles, each switching cycle comprising a positive current through the primary of the transformer and a negative current through the primary of the transformer.

7. The welding-type power supply as defined in claim 1, wherein the switched mode power supply comprises a stacked full bridge topology.

8. A welding-type power supply, comprising:
    a switched mode power supply, comprising:
        a transformer configured to transform a bus voltage to a welding-type voltage;
        a capacitor in series with a primary winding of the transformer, the capacitor having a capacitor voltage; and
        switches configured to control a voltage applied to a series combination of the primary winding of the transformer and the capacitor; and
    a controller configured to:
        detect a transient condition in which the bus voltage exceeds a threshold voltage;
        control duty cycles of the switches in response to the transient condition to adjust the capacitor voltage based on the bus voltage; and
        adjust the duty cycles of the switches to unbalance a net flux in the transformer for a threshold time period to adjust the capacitor voltage in response to the transient condition.

9. The welding-type power supply as defined in claim 8, wherein the threshold time period is approximately two milliseconds.

10. The welding-type power supply as defined in claim 8, wherein the controller is further configured to adjust the duty cycles of the switches to balance the net flux in response to at least one of elapsing of the threshold time period or determining that the capacitor voltage is within a threshold voltage range based on the bus voltage.

11. A method to control a welding-type power supply, comprising:
    controlling, via control circuitry, switches of a stacked full bridge switched mode power supply to provide current to a primary winding of a transformer to generate a welding-type current output via a secondary winding of the transformer, the primary winding being in series with a capacitor having a capacitor voltage;
    detecting, via the control circuitry, a transient condition on a bus voltage input to the stacked full bridge switched mode power supply;
    in response to detecting the transient condition, controlling duty cycles of the switches via the control circuitry to adjust the capacitor voltage based on the bus voltage;

determining, via a flux accumulator, a net flux in the transformer based on a number of volt-seconds applied to the primary winding of the transformer; and controlling, via the control circuitry, the duty cycles of the switches to balance the net flux when the capacitor voltage is within a threshold voltage range based on the bus voltage.

12. The method as defined in claim 11, wherein the control circuitry detects the transient condition based on comparing one of the welding-type voltage, the bus voltage, or the capacitor voltage to a transient threshold voltage.

13. A method to control a welding-type power supply, comprising:

controlling, via control circuitry, switches of a stacked full bridge switched mode power supply to provide current to a primary winding of a transformer to generate a welding-type current output via a secondary winding of the transformer, the primary winding being in series with a capacitor having a capacitor voltage;

detecting, via the control circuitry, a transient condition on a bus voltage input to the stacked full bridge switched mode power supply;

in response to detecting the transient condition, controlling duty cycles of the switches via the control circuitry to adjust the capacitor voltage based on the bus voltage; and adjusting, via control circuitry, the duty cycles of the switches to unbalance a net flux in the transformer for a threshold time period to adjust the capacitor voltage in response to the transient condition.

14. The method as defined in claim 13, further comprising adjusting, via control circuitry, the duty cycles of the switches to balance the net flux in response to at least one of elapsing of the threshold time period or determining that the capacitor voltage is within a threshold voltage range based on the bus voltage.

* * * * *